(12) United States Patent
Kamimura et al.

(10) Patent No.: US 6,433,076 B1
(45) Date of Patent: Aug. 13, 2002

(54) LOW-STAINING AGENT FOR AQUEOUS PAINT, LOW-STAINING AQUEOUS PAINT COMPOSITION, AND PROCESS FOR USE THEREOF

(75) Inventors: Shigeto Kamimura; Hiroyoshi Ono; Yoshifumi Asada; Hisashi Suzuki, all of Ibaraki (JP)

(73) Assignee: SK Kaken Co., Ltd. (JP)

( * ) Notice: Subject to any disclaimer, the term of this patent is extended or adjusted under 35 U.S.C. 154(b) by 0 days.

(21) Appl. No.: 09/341,786

(22) PCT Filed: Jul. 21, 1998

(86) PCT No.: PCT/JP98/03293

§ 371 (c)(1),
(2), (4) Date: Jul. 16, 1999

(87) PCT Pub. No.: WO99/05228

PCT Pub. Date: Feb. 4, 1999

(30) Foreign Application Priority Data

Jul. 24, 1997 (JP) .............................................. 9-215750

(51) Int. Cl.$^7$ .............................................. C08L 83/00
(52) U.S. Cl. ...................... 524/837; 524/806; 524/858; 524/863
(58) Field of Search ................................ 524/492, 493, 524/805, 837, 858, 859, 800; 523/177; 406/287.13; 106/287.16, 606

(56) References Cited

U.S. PATENT DOCUMENTS 4,146,511 A * 3/1979 Moriya et al. ................. 260/3
5,712,335 A * 1/1998 Tsuda et al. ................. 524/269
5,733,644 A * 3/1998 Tanaka et al. ............... 428/215
5,780,530 A * 7/1998 Mizutani et al. ............. 523/209
5,922,787 A * 7/1999 Kondo et al. ................ 523/122

FOREIGN PATENT DOCUMENTS

| JP | 08113755 | * | 6/1995 |
| JP | 09137119 | * | 11/1995 |
| JP | 09031401 | * | 12/1995 |
| JP | 10168382 |   | 6/1998 |

* cited by examiner

Primary Examiner—Edward J. Cain
Assistant Examiner—Katarzyna W. Lee
(74) Attorney, Agent, or Firm—Webb Ziesenheim Logsdon Orkin & Hanson, P.C.

(57) ABSTRACT

There is provided a low-staining agent which can outstandingly improve an anti-staining property and a property of preventing penetration of a staining substance when it is added to an aqueous paint, which does not affect a weather resistance and a water resistance of the paint, and which has an excellent compatibility with the aqueous paint. The present invention also relates to a low-staining aqueous paint composition to which said low-staining agent is added. The present invention relates to an aqueous paint low-staining agent which is a modified condensation product of alkoxysilane having at least one polyoxyalkylene group and an alkoxyl group, wherein a repetition unit of said polyoxyalkylene group has 1 to 4 carbon atoms, and said alkoxyl group has 1 to 4 carbon atoms. In particular, it is preferable that the polyoxyalkylene group is a polyoxyethylene group and the alkoxyl group is an ethoxy group.

10 Claims, No Drawings

LOW-STAINING AGENT FOR AQUEOUS PAINT, LOW-STAINING AQUEOUS PAINT COMPOSITION, AND PROCESS FOR USE THEREOF

TECHNICAL FIELD

The present invention relates to an low-staining agent for aqueous paint to be used especially for surface finishing treatment of various materials, such as metal, glass, porcelain tile, concrete, siding board, extrusion-molded plate, plastics, and the like, which are used outside, and further to a low-staining aqueous paint composition to which the low-staining agent is added. The low-staining agent for aqueous paint of the present invention and the aqueous paint composition using the same are paints that are used especially for surface coating of a structure such as an architecture or a bridge, and may be a paint directly applied on a base material or can be used as a paint for final finishing paint such as various finishing paints, patterning paints, stony surface paints, and pattern paints.

BACKGROUND OF THE INVENTION

Recently, in the field of paints to be used for architectures and civil-engineered structures, a transition from solvent-type paints using organic solvent to aqueous paints using water as a solvent is taking place. This is carried out for the purposes of reducing the damage to health of paint workers and inhabitants and of reducing the ambient air pollution, and the aqueous paints for use are increasing in number year by year.

Some of the known aqueous paints have the same level of efficiency with the solvent-type paints concerning the weather resistance and the water resistance. However, with respect to the staining resistance property in particular, aqueous paints advertised as a low-staining type is at present far from the level of the solvent-type low-staining paints.

Also, the coating film by the aqueous paint generally has a lower coating film hardness as compared with the coating film by a organic solvent based paint, and the penetration of an adhering staining substance tends to be high. Therefore, once a staining substance adheres, it is often difficult to remove the stain from the coating film surface.

As a low-staining paint that has solved such a problem, WO 94/06870 discloses an art of blending a specific organosilicate and/or its condensation product into a paint. More specifically, the art disclosed in WO 94/06870 is characterized in that a specific organosilicate and/or its condensation product is blended, and the coating film surface is made hydrophilic by treating the coating film with an acid after the coating film formation, so that an oily staining substance will not adhere easily and the adhering staining substance will be washed away together with water drops of falling rain, for example.

However, in the art disclosed in WO 94/06870, an organosilicate and/or its condensation product is simply added to an organic solvent paint. A paint obtained by adding an organosilicate and/or its condensation product to the aqueous paint by applying this prior art to an aqueous paint has the following problems because of poor compatibility between the aqueous paint and the organosilicate and/or its condensation product, and these problems must be solved for its practical application
1) In many cases, sediments are generated in the mixture in a short time after the addition (within about one hour)
2) An aqueous clear paint that does not contain any pigment forms a turbid coating film.
3) In an aqueous paint having a high luster and generally referred to as "gloss paint", its surface luster considerably decreases.

These seem to be due to the poor compatibility between the aqueous paint and the organosilicate and/or its condensation product as mentioned above.

The problems to be solved by the present invention are as follows.
a. To provide a low-staining agent that can outstandingly improve the anti-staining, property and the property of preventing penetration of the staining substance when it is added to an aqueous paint.
b. To provide a low-staining agent that does not affect the weather resistance and the water resistance and that does not affect the luster when it is added to an aqueous paint.
c. To provide a low-staining agent excellent in the compatibility with an aqueous paint.

Also, the purpose of the present invention is to provide a low-staining aqueous paint composition to which said low-staining agent is added.

DISCLOSURE OF THE INVENTION

The inventors of the present invention have made an eager study in order to solve these problems and found out that a good coating film having a good anti-staining property and a resistance to penetration of a staining substance, and further being excellent in weather resistance and water resistance can be formed by adding a modified condensation product of alkoxysilane having at least one polyalkylene oxide group to various aqueous paints, thereby completing the present invention.

The present invention relates to the following aqueous paint low-staining agent and an aqueous paint composition using the same.

The invention described in claim 1 relates to an aqueous paint low-staining agent characterized by being a modified condensation product of alkoxysilane having at least one polyoxyalkylene group and an alkoxyl group, wherein a repetition unit of said polyoxyalkylene group has 1 to 4 carbon atoms, and said alkoxyl group has 1 to 4 carbon atoms.

The invention described in claim 2 relates to an aqueous paint low-staining agent according to claim 1, characterized in that said polyoxyalkylene group is a polyoxyethylene group having two carbon atoms in the repetition unit, and said alkoxyl group is an ethoxy group having two carbon atoms.

The invention described in claim 3 relates to a low-staining aqueous paint composition characterized in that 1.0 to 40.0 parts by weight, as converted in terms of $SiO_2$, of an aqueous paint low-staining agent (B) are added to 100 parts by weight of a solid component of a synthetic resin emulsion (A), said aqueous paint low-staining agent being a modified condensation product of alkoxysilane having it least one polyoxyalkylene group and an alkoxyl group, wherein a repetition unit of said polyoxyalkylene group has 1 to 4 carbon atoms, and said alkoxyl group has 1 to 4 carbon atoms.

In the above-mentioned low-staining aqueous paint composition, it is preferable that said aqueous paint low-staining agent (B) is one in which said polyoxyalkylene group is a polyoxyethylene group having two carbon atoms in the repetition unit, and said alkoxyl group is an ethoxy group having two carbon atoms.

It is preferable that the synthetic resin emulsion (A) to be used in the low-staining aqueous paint composition of the present invention is one selected from an acrylic resin emulsion, an acrylic silicone resin emulsion, a fluorine containing resin emulsion, and an polyurethane resin emulsion; and it is especially suitable that these synthetic resin emulsions are cross-linkable type emulsions.

The invention described in claim 10 relates to a process for use of a low-staining aqueous paint composition, characterized in that 1.0 to 40.0 parts by weight, as converted in terms of $SiO_2$, of an aqueous paint low-staining agent (B) are added and mixed to 100 parts by weight of a solid component of a synthetic resin emulsion (A) for painting, said aqueous paint low-staining agent being a modified condensation product of alkoxysilane having at least one polyoxyalkylene group and an alkoxyl group, wherein a repetition unit of said polyoxyalkylene group has 1 to 4 carbon atoms, and said alkoxyl group has 1 to 4 carbon atoms.

The low-staining agent reacts with water, so that one should avoid keeping it in contact with a water-containing synthetic resin emulsion for an excessively long period of time. The above construction enables the low-staining aqueous paint composition to sufficiently exhibit its inherent characteristics by using it in the distribution stage as a multi-component type paint having two or more components and mixing them at the time of use.

BEST MODES FOR CARRYING OUT THE INVENTION

Hereafter, the present invention will be explained in detail on the basis of embodiments thereof.
(1) As to Aqueous Paint Low-staining Agent The aqueous paint low-staining agent of the present invention is characterized by being a modified condensation product of alkoxysilane having at least one polyoxyalkylene group and an alkoxyl group, wherein a repetition unit of said polyoxyalkylene group has 1 to 4 carbon atoms, and said alkoxyl group has 1 to 4 carbon atoms.

As a process for producing the low-staining agent of the present invention, it is possible to use a process without any particular limitation as long as a modified condensation product of alkoxysilane having at least one polyoxyalkylene group whose repetition unit has 1 to 4 carbon atoms, and an alkoxyl group having 1 to 4 carbon atoms is obtained in the end. The specific process for producing the low-staining agent may be, for example, a process in which one of or a mixture of two or more of condensation products of alkoxysilane is subjected to an ester exchange reaction or an addition reaction using a coupling agent, with one of or two or more of compounds containing a polyoxyalkylene group.
i) Ester Exchange Reaction The low-staining agent of the present invention is produced by subjecting a condensation product of alkoxysilane (hereafter referred to as "(a) component"; the material before the condensation is referred to as "monomer of (a) component")represented by the general formula:

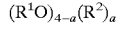

(wherein $R^1$ represents an alkyl group having 1 to 4 carbon atoms; $R^2$ represents an alkyl group, an aryl group, an aralkyl group, or an alkoxyl group having 1 to 4 carbon atoms; and a represents an integer of 0 to 2), to an ester exchange reaction with a polyoxyalkylene-chain-containing compound (hereafter referred to as "(b) component") represented by the general formula:

(wherein $R^3$ represents a hydrogen atom, alkyl group, an epoxy group, or an acyl group; $R^4$ represents a hydroxy group, an alkyl group, an alkoxyl group, an epoxy group, an acyl group, or a carboxyl group; n represents an integer of 1 to 4; and m represents an integer of 1 to 20). In particular, in the ester exchange reaction, it is necessary to use a (b) component having at least one hydroxy group at its terminal (here, this does not necessarily apply if a later-mentioned addition reaction using a coupling agent is carried out).

Specific examples of the monomers of the (a) component include tetramethoxysilane, tetraethoxysilane, tetra-n-propoxysilane, tetra-i-propoxysilane, tetra-n-butoxysilane, tetra-i-butoxysilane, tetra-t-butoxysilane, methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, propyltrimethoxysilane, propyltriethoxysilane, propyltripropoxysilane, propyltributoxysilane, butyltrimethoxysilane, butyltriethoxysilane, butyltripropoxysilane, butyltributoxysilane, dimethyldimethoxysilane, dimethyldiethoxysilane, dimethyldipropoxysilane, dimethyldibutoxysilane, diethyldimethylsilane, diethyldiethoxysilane, diethyldipropoxysilane, and diethyldibutoxysilane. These compounds may be used alone or as a mixture of plural kinds thereof.

The alkoxyl group of the (a) component preferably has 1 to 4 carbon atoms. If the number of carbon atoms exceed 5, a high-temperature heating will be necessary in the ester exchange reaction of the monomer of the (a) component with the (b) component. However, since the thermal stability of the (a) component is inferior, there is a tendency of generating a gel which is unusable in the course of the ester exchange reaction.

Also, the average degree of condensation of the (a) component is preferably 1 to 20. If the average degree of condensation exceeds 20, the handling will be difficult, so that it is not preferable.

Specific examples of the (b) components include polyoxyethylene glycol, polyoxyethylene glycol monoalkyl ether, polyoxyethylene-propylene glycol, polyoxyethylene-tetramethylene glycol, polyoxyethylene glycol diglycidyl ether, polypropylene glycol diglycidyl ether, polyoxyethylene diglycolic acid, polyoxyethylene glycol vinyl ether, polyoxyethylene glycol allyl ether, polyoxyethylene glycol diallyl ether, polyoxyethylene alkyl ether, polyoxyethylene sorbitane aliphatic acid ester, polyoxyethylene aliphatic acid ester, and polyoxyethylene alkylamine. These compounds may be used alone or as a combination of two or more of these.

The (b) component preferably has an average molecular weight of 150 to 2000.

In the case of average molecular weight is less than 150, the stability of the paint mixed with the low-staining, agent obtained by the ester exchange reaction of such (b)component with the (a) component tends to be inferior, making it difficult to obtain an excellent luster. On the other hand, in the case of the average molecular weight of the (b) component exceeds 2000, the water resistance and the hardness of the cured coating film tend to decrease.

In the above, an example was shown in which an ester exchange reaction is carried out after the condensation of the monomer of the (a) component. However, it is possible to use a process in which the condensation is carried out after the monomer of the (a) component is subjected to an ester exchange reaction with the (b) component.

In carrying out the ester exchange reaction, it is possible to use an ester exchange catalyst (hereafter referred to as "(c) component").

Examples of the (c) component are the following compounds.

Organotin compounds such as dibutyltin dilaurate, dibutyltin malate, dioctyltin dilaurate, and dioctyltin malate;

phosphoric acid or phosphoric acid esters such as phosphoric acid, monomethyl phosphate, monoethyl phosphate, and monooctyl phosphate;

addition products of an epoxy compound, such as propylene oxide, butylene oxide, glycidyl methacrylate, γ-glycidoxypropyltriethoxysilane, or Epicote 828, with phosphoric acid and/or an acidic monophosphate;

organotitanate compounds;

organoaluminum compounds;

organozirconium compounds;

acidic compounds such as maleic acid, adipic acid, azelaic acid, acid anhydrides thereof, and paratoluenesulfonic acid;

amines such as hexylamine and N,N-dimethyldodecylamine; and alkaline compounds such as sodium hydroxide.

These (c) components may be used alone or as a mixture of two or more of these. The (c) component is used in an amount of 0.0001 to 5 parts by weight with respect to 100 parts by weight of the (a) component. If the amount of the (c) component to be used is less than 0.0001 part by weight, the contribution to the ester exchange reaction will be small. On the other hand, if the amount is more than 5 parts by weight, the condensation reaction of the (a) component will be fast and the stability of the low-staining agent will decrease, so that it is not preferable.

ii) Addition Reaction Using a Coupling Agent

The low-staining agent of the present invention can be produced by an addition reaction using a coupling agent (hereafter referred to a,; "(d) component") having a reactive functional group that bonds the (a) component and the (b) component, and one or more alkoxysilyl groups in one molecule, instead of the production process in which the (b) component is introduced into the (a) component by an ester exchange reaction.

The reactive functional group in the (d) component may be, for example, vinyl group, epoxy group, amino group, isocyanate group, or thiol group. The functional group may be one bonded to the alkoxysilyl group via urethane bond, urea bond, siloxane bond, amide bond, or the like.

Specific examples of the (d) component include γ-glycidoxypropylmethyldiethoxysilane, γ-glycidoxypropylmethyltriethoxysilane, β-(3,4-epoxycyclohexyl)ethyltrimethoxysilane, N-β-(aminoethyl)γ-aminopropylmethyltriethoxysilane, γ-aminopropyltrimethoxysilane, γ-aminopropyltriethoxysilane, γ-methacryloxypropylmethyldiethoxysilane, and γ-methacryloxypropyltriethoxysilane.

(2) Process for Use of Aqueous Paint Low-staining Agent

The aqueous paint low-staining agent of the present invention is used by being added into a general aqueous paint. As the addition process, it can be added directly to the aqueous paint, or it can be added to the aqueous paint after mixing it with a solvent capable of mixing the low-staining agent or into a cross-linking agent or the like. The amount of addition is preferably such that it is added at 1.0 to 40.0 parts by weight as converted in terms of $SiO_2$ with respect to 100 parts by weight of the solid component of the synthetic resin emulsion of the aqueous paint.

Here, the amount as converted in terms of $SiO_2$ represents an amount of silica ($SiO_2$) remaining when it is calcined at 900° C. after complete hydrolysis of a compound having an Si—O bond, such as alkoxysilane or a silicate.

Generally, an alkoxysilane or a silicate reacts with water in an hydrolysis reaction to become a silanol, and further, silanols among themselves or silanol and an alkoxyl group undergo a condensation reaction. If this reaction is carried out to the end, the resultant will be a silica ($SiO_2$). This reaction is represented by the reaction formula:

$$RO(Si(OR)_2O)-R+(n+1)H_2O \rightarrow nSiO_2+(2n+2)R-OH$$

Based on this reaction formula, it was determined by converting into the amount of the remaining silica component.

Actual calculation was carried our by the following formula:

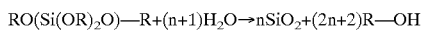

Silica residual ratio (as converted in terms of $SiO_2$)=m×w/100, where m is an actual amount of added modified condensation product of alkoxysilane or an alkoxysilane compound, and w is a silica residual ratio (wt %) of the modified condensation product of alkoxysilane or an alkoxysilane compound.

The low-staining effect is not obtained even if less than 1.0 part by weight of the low-staining agent of the present invention is added to 100 parts by weight of the solid component of the synthetic resin emulsion of the paint. Further, if more than 40 parts by weight are added, there is a tendency that the compatibility with the paint decreases and the luster decreases, so that it is not preferable.

The low-staining agent of the present invention may be used alone, but it is also possible to use in combination with an alkoxysilane compound such as shown previously as the (a) component in an amount that does not inhibit the effects of the present invention.

(3) As to the Aqueous Paint to which the Agent is Added

The aqueous paint to which the aqueous paint low-staining agent of the present invention is added contains a synthetic resin emulsion as a binder and other various additives for the paint.

The synthetic resin emulsion may be, for example, an acrylic resin emulsion, an acrylic silicone resin emulsion, a fluorine containing resin emulsion, or an polyurethane resin emulsion.

[Acrylic Resin Emulsion]

The acrylic resin emulsion to be used may be, for example, a product obtained by radical copolymerization of an acrylic monomer and another monomer copolymerizable with the acrylic monomer.

The acrylic monomer is not specifically limited, but may be, for example, one of the following monomers.

(Meth)acrylic monomers containing an alkyl group such as methyl (meth)acrylate (which indicates methyl acrylate or methyl methacrylate. The same applies hereafter.), ethyl (meth)acrylate, n-butyl (meth)acrylate, i-butyl (meth) acrylate, 2-ethylhexyl (meth)acrylate, and cyclohexyl (meth)acrylate;

(meth)acrylic monomers containing a hydroxy group such as 2-hydroxyethyl (meth)acrylate;

ethylenic unsaturated carboxylic acids such as (meth) acrylic acid;

(meth)acrylic monomers containing an amino group such as dimethylaminoethyl (meth)acrylate and dimethylaminopropyl (meth)acrylate;

(meth)acrylic monomers containing a nitrile group such as acrylonitrile;

(meth)acrylic monomers containing an epoxy group such as glycidyl (meth)acrylate.

Examples of the other monomer copolymerizable with these acrylic monomers include aromatic hydrocarbon based vinyl monomers such as styrene, methylstyrene, chlorostyrene, and vinyltoluene; α,β-ethylenic unsaturated carboxylic acids such as maleic acid, itaconic acid, crotonic acid, fumaric acid, and citraconic acid; vinyl monomers containing sulfonic acid such as styrenesulfonic acid and vinylsulfonic acid; acid anhydrides such as maleic anhydride and itaconic anhydride; chlorine-containing monomers such as vinyl chloride, vinylidene chloride, and chloroprene; alkyl vinyl ethers containing a hydroxy group such as hydroxyethyl vinyl ether and hydroxypropyl vinyl ether; alkylene glycol monoallyl ethers such as ethylene glycol monoallyl ether, propylene glycol monoallyl ether, and diethylene glycol monoallyl ether; α-olefins such as ethylene, propylene, and isobutylene; vinyl esters such as vinyl acetate, vinyl propionate, vinyl butyrate, and vinyl pivalate; vinyl ethers such as methyl vinyl ether, ethyl vinyl ether, butyl vinyl ether, and cyclohexyl vinyl ether; and allyl ethers such as ethyl allyl ether and butyl allyl ether.

It is advantageous in terms of durability, degree of luster, costs, the degree of freedom in resin design, and the like if an acrylic emulsion is used as the synthetic resin emulsion (A).

[Acrylic Silicone Resin Emulsion]

The acrylic silicone resin emulsion to be used may be, for example, a product obtained by radical copolymerization of a silicon-containing acrylic monomer and another monomer copolymerizable with the silicon-containing acrylic monomer.

The silicon-containing acrylic monomer is not specifically limited, but may be, for example, a vinyl monomer containing a hydrolyzable silyl group such as γ-(meth)acryloxypropyltrimethoxysilane, γ-(meth)acryloxypropyltriethoxysilane, γ-(meth)acryloxypropylmethyldimethoxysilane, or γ-(meth)acryloxypropylmethyldiethoxysilane.

The other monomer copolymerizable with the silicon-containing acrylic monomer to be used is not specifically limited and may be, for example. an acrylic monomer used in the above-mentioned acrylic resin emulsion or another monomer copolymerizable with the acrylic monomer.

It is advantageous in terms of weather resistance, antiyellowing property, durability, chemical resistance, staining resistance, and the like if an acrylic silicone resin emulsion is used as the synthetic resin emulsion (A).

[Fluorine Containing Resin Emulsion]

The fluorine containing resin emulsion to be used may be, for example, a product obtained by radical copolymerization of a fluorine-containing monomer and another monomer copolymerizable with the fluorine-containing monomer.

Examples of the fluorine-containing monomer include fluoroolefins such as vinylidene fluoride, trifluoroethylene, tetrafluoroethylene, pentafluoroethylene, hexatluoropropylene; and fluorine-containing (meth)acrylates such as trifluoroethyl (meth)acrylate, pentafluoropropyl (meth)acrylate, and perfluorocyclohexyl (meth)acrylate.

The other monomer copolymerizable with the fluorine-containing monomer to be used is not specifically limited and may be, for example, an acrylic monomer used in the above-mentioned acrylic resin emulsion or another monomer copolymerizable with the acrylic monomer.

It is advantageous in terms of weather resistance, antiyellowing property, durability, chemical resistance, staining resistance, and the like if a fluorine containing resin emulsion is used as the synthetic resin emulsion (A).

[Polyurethane Resin Emulsion]

The urethane resin emulsion generally refers to an emulsion which will have an urethane bond in a coating film after the coating film is formed. In other words, it may be an emulsion already having an urethane bond before the coating film is formed, or an emulsion which will have an urethane cross-link by a reaction after the coating film is formed. The emulsion may have a form of one-component type or two-component type.

As the one-component type, there are, for example, a process in which a polymerizing monomer having an urethane bond is copolymerized with another copolymerizable monomer, a process in which a polymerizable unsaturated monomer is polymerized in the presence of an aqueous resin having an urethane bond, and a process of mixing an aqueous urethane resin having a reactive group with an emulsion resin containing a group capable of reacting with the reactive group.

As the two-component type, there is, for example, a combination of a water-dispersable isocyanate and an emulsion containing a hydroxy group.

It is advantageous in terms of durability, solvent resistance, chemical resistance, staining resistance, and the like if an urethane resin emulsion is used as the synthetic resin emulsion (A).

[Cross-linkable Reaction Type Emulsion]

Among the synthetic resin emulsion, it is possible to use an emulsion that undergoes cross-linking reaction between a carbonyl group and a hydrazide group, a carboxylic acid and a metal ion, an epoxy group and an amine, an epoxy group and a carboxyl group, a carboxylic acid and aziridine, a carboxylic acid and a carbodiimide, a carboxylic acid and oxazoline, or acetoacetate and a ketimine besides the cross-linking reaction by the above-mentioned hydroxy group and an isocyanate group, for example. The cross-linkable type emulsion may be of one-component type or a multi-component type of two or more components.

It is advantageous in terms of durability, solvent resistance, chemical resistance, staining resistance, and the like if a cross-linking reaction type emulsion is used as the synthetic resin emulsion (A).

The process for producing the synthetic resin emulsion is not limited, but it can be produced by using batch polymerization, monomer dropping polymerization, emulsion monomer dropping polymerization, or the like as an emulsion polymerization process.

The emulsifier may be used for the polymerization with no limitation as long as it is an emulsifier generally used, and may be an anionic, cationic, nonionic, amphoteric, nonionic-cationic, or nonionic-anionic emulsifier used alone or in combination. Also, it is possible to use an emulsifier having a reactive group for the purpose of improving the water resistance.

As the polymerization initiator, it is possible to use a known radical initiator used for the production of a synthetic emulsion, and may be, for example, a redox initiator composed of a combination of a persulfate such as ammonium persulfate salt, hydrogen peroxide, and sodium hydrogensulfite, or the like, or a system in which an inorganic initiator such as a ferrous salt or silver nitrate is mixed, or an organic initiator such as a dibasic acid peroxide such as disuccinic acid peroxide or diglutaric acid peroxide, or azobisbutyronitrile.

The polymerization initiator can be used in an amount of 0.01 to 5 parts by weight with respect to 100 parts by weight of the monomer. In addition, it is possible to add an inorganic salt such as sodium carbonate, potassium carbonate, or sodium thiosulfate, and an organic base such as triethylamine or triethanolamine for pH adjustment of the emulsion.

It is preferable to add a curing catalyst in the aqueous paint to which the low-staining agent of the present invention is added. The curing catalyst is suitably added in an amount of 0.1 to 10 parts by weight with respect to 100 parts by weight of the aqueous paint. If the added amount is less than 0.1 part by weight, the reaction speed will be slow, so that as a result the effect of low-staining property of the cured coating film tends to decrease. If the added amount is more than 10 parts by weight, the appearance and the durability of the coating film tend to decrease.

Examples of such curing catalysts include organotin compounds such as dibutyltin dilaurate, dibutyltin malate, dioctyltin dilaurate, and dioctyltin malate; phosphoric acid or phosphoric acid esters such as phosphoric acid, monomethyl phosphate, monoethyl phosphate, and monooctyl phosphate; addition products of an epoxy compound, such as propylene oxide, butylene oxide, glycidyl methacrylate, γ-glycidoxypropyltriethoxysilane, and Epicote 828, with phosphoric acid and/or an acidic monophosphate; organotitanate compounds; organoaluminum compounds; organozirconium compounds; acidic compounds such as maleic acid, adipic acid, azelaic acid, acid anhydrides thereof, and paratoluenesulfonic acid; amines such as hexylamine and N,N-dimethyldodecylamine; and alkaline compounds such as sodium hydroxide. These curing catalysts may be used alone or as a mixture of two or more of these.

These curing catalysts can be added after emulsified and dispersed by using a surface active agent. The surface active agent to be used is not specifically limited, but may be suitably a nonionic, anionic, or nonionic-anionic one.

To the aqueous paint to which the low-staining agent of the present invention is to be added, it is possible to blend a film-forming auxiliary agent, an inorganic coloring pigment, an organic coloring pigment, an extender pigment, and the like which are generally used, in accordance with the needs. Also, it is possible to blend additives such as a plasticizer, a preservative, a anti-microbial agent, an anti-foaming agent, a leveling agent, a pigment dispersing agent, an anti-settling agent, an anti-sagging agent, a delustering agent, an ultraviolet absorber, an anti-oxidant, and the like either alone or in combination in such amounts that do not affect the present invention.

(4) As to Use of Aqueous Paint Composition

An aqueous paint composition to which the low-staining agent of the present invention is added can be used for surface finishing treatment of various materials such as metal, glass, porcelain tile, concrete, siding board, extrusion-molded board, and plastics, and is mainly used for protection of a body of an architectural structure, a civil-engineered structure, or the like. The aqueous paint composition to which the low-staining agent of the present invention is added is applied to the final finishing surface, and can be directly applied to the base material or can be applied after a certain surface treatment (such as undercoating treatment) is carried out, but it is not specifically limited. The method for application may be selected from a variety of methods such as the brush coating method, the spray coating method, the roller coating method, the roll coater method, and the flow coater method. Further, it is possible to carry out precoating a building material surface in a factory or the like.

Hereafter, Examples and Comparative Examples will be shown to make the characteristics of the present invention more clearer.

(1) Production of Low-staining Agent

Synthesis Example 1

Synthesis Example of a Modified Condensation Product E of Alkoxysilane

A modified condensation product E of alkoxysilane was synthesized by mixing 100.0 parts by weight of a condensation product P of ethyl silicate (average molecular weight of 750, silica residual ratio of 40 wt %) having an average molecular weight of 750, which is a condensation product of tetraethoxysilane, and 106.7 parts by weight of polyoxyethylene glycol (PEG) #200 (supplied by Wako Jun-yaku KK.) having an average molecular weight of 200, and adding 0.02 part by weight of dibutyltin dilaurate as a catalyst, followed by an ethanol eliminating reaction at 75° C. for 8 hours.

The silica residual ratio obtained by calcination of this modified condensation product E of alkoxysilane at 900° C. was 20.9 wt %.

Synthesis Example 2

Synthesis Example of a Modified Condensation Product F of Alkoxysilane

A modified condensation product F of alkoxysilane was synthesized in the same manner as in the Synthesis Example 1 by mixing 100 parts by weight of a condensation product P of ethyl silicate and 81.7 parts by weight of polyoxyethylene glycol monocetyl ether (supplied by Tokyo Kasei KK.) having an average molecular weight of 400, and adding 0.02 part by weight of dibutyltin dilaurate as a catalyst.

The silica residual ratio of this modified condensation product F of alkoxysilane was 22.2 wt %.

Synthesis Example 3

Synthesis Example of a Modified Condensation Product G of Alkoxysilane

A modified condensation product G of alkoxysilane was synthesized in the same manner as in the Synthesis Example 1 by mixing 100 parts by weight of a condensation product Q of ethyl silicate (average molecular weight of 900, silica residual ratio of 45 wt %) having an average molecular weight of 900 and 385.4 parts by weight of polyoxyethylene lauryl ether (supplied by Kao KK.) having an average molecular weight of 1000, and adding 0.02 part by weight of dibutyltin dilaurate as a catalyst.

The silica residual ratio of this modified condensation product G of alkoxysilane was 11.7 wt %.

The above results are shown together in Table 1.

(2) Addition of Low-staining Agent to Synthetic Resin Emulsion (i) Preparation of Paint EXAMPLES 1 to 5

Paints were prepared by using materials shown in Table 2. The blending ratios of the paints are shown in Table 3.

Namely, in Example 1, a clear paint was prepared by using specifically 200 parts by weight of fluoroolefin-vinyl ether copolymer emulsion and 13.9 parts by weight of modified condensation product E of alkoxysilane (blended so as to be about 5.0 parts by weight as converted in terms of $SiO_2$ with respect to the solid component of the resin), adding 17.8 parts by weight of 2,2,4-trimethyl-1,3-pentanediol monoisobutyrate (trade name: Texanol) as a film-forming auxiliary agent, sufficiently stirring the mixture, adding 1.0 part by weight of dibutyltin dilaurate, followed by further stirring.

In Examples 2 to 5, clear paints were prepared following the same procedure as in the Example 1.

Comparative Examples 1 to 3

The blending ratios of the paints of Comparative Examples 1 to 3 are shown in Table 4. The clear paints of Comparative Examples 1 to 3 were prepared by the same process as in Example 1.

EXAMPLES 6 to 10

Paints were prepared by using materials shown in Table 2 and following the blending ratios shown in Table 3, and the following evaluation was carried out. Namely, in Example 6, a paint composition was prepared by mixing 200 parts by weight of fluoroolefin-vinyl ether copolymer emulsion, 75 parts by weight of titanium oxide (rutile type), 13.9 parts by weight of modified condensation product A of alkoxysilane (blended so as to be about 5.0 parts by weight as converted in terms of $SiO_2$ with respect to the solid component of the resin), and 17.8 parts by weight of Texanol, sufficiently stirring the mixture, adding 1.0 part by weight of dibutyltin dilaurate, and sufficient stirring, and it was subjected to the following evaluation.

In Examples 7 to 10, paint compositions were prepared in the same manner as in Example 6.

Comparative Examples 4 to 6

The blending ratios of the paints of Comparative Examples 4 to 6 are shown in Table 4. The paints of Comparative Examples 4 to 6 were prepared by the same process as in Example 6.

(ii) Evaluation and Its Results

In Examples 1 to 5 and Comparative Examples 1 to 3, the paints prepared by the above-mentioned process were evaluated for-compatibility in the state of clear paints. The paints of Examples 6 to 10 and Comparative Examples 4 to 6 were white paints, and evaluated for luster of the coating film, the stability of the paints, the rain streak staining property, and the resistance to penetration of stains.

1. Evaluation of Compatibility

The paints of Examples 1 to 5 and Comparative Examples 1 to 3 are clear paints. These clear paints were applied by spray coating on a transparent glass plate of 150×120×3 mm so that the dry film thickness would be 40 μm, and cured by drying at a temperature of 20° C. and a humidity of 65% (hereafter referred to as "standard state") for 24 hours, followed by evaluation of the transparency of the film by visual observation.

The evaluation was represented as follows, and the results are shown in Table 5.

o: Completely transparent state
X: Turbid and opaque state
<Results>

From the results of Table 5, it has been made clear that, in all of Examples 1 to 5, a transparent coating film was obtained and the compatibility of the modified condensation product E of alkoxysilane and the resin was excellent.

On the other hand, in Comparative Examples, a turbidity of the coating film due to the incompatibility with the resin was observed with respect to the clear paints blended with a commercially available alkoxysilane which had not been modified with a polyoxyalkylene compound.

2. Measurement of Gloss(Luster Degree) of Mirror Surface at an Angle of 60 Degrees The coating compositions of Examples 6 to 10 and Comparative Examples 4 to 6 were applied by an applicator on a transparent glass plate of 150×120×3 mm so that the wet film thickness would be 125 μm. After it was cured by drying in the standard state for 7 days, the luster value was measured at an angle of 60 degrees according to the JIS K5400 (1990) 7.6 mirror surface luster degree. Also, as a comparison blank, a coating composition was prepared by using a blending ratio excluding the modified condensation product E of alkoxysilane from the blending ratios of Example 6, and a similar test was conducted. The results are shown in Table 6.

3. Stability of Paint

With respect to Examples 6 to 10 and Comparative Examples 4 to 6, 100 g of the prepared paint composition was weighed and left to stand for one hour in the standard state for confirming the presence or absence of sediments. The evaluation was represented as follows, and the results are shown in Table 6.

o: No sediments
X: with sediments

4. Evaluation of Rain Streak Staining

With respect to the paint compositions of Examples 6 to 10 and Comparative Examples 4 to 6, an aluminum plate of 300×150×3.0 mm (hereafter referred to as "exposure plate") was bent at a length of a third thereof from above so that the inner angle would be 135 degrees, and an SK #1000 primer (epoxy resin primer; supplied by SK Kaken KK.) was applied on the aluminum plate by spray coating so that the dried film thickness would be about 30 μm and dried in the standard state for 8 hours. (The convex surface of the exposure plate is assumed to be the front surface).

Next, the prepared paint composition was applied by spray coating on the exposure plate having the above-mentioned primer applied thereon so that the dried film thickness would be about 40 μm, and was dried in the standard state for 7 days to make a test body.

The prepared test body was placed facing south in Ibaraki city, Osaka, Japan with its surface having a larger area being vertical and with its surface having a smaller area facing upwards for outside exposure for evaluation of the presence or absence of rain streak staining after 6 months by visual observation.

The evaluation was represented as follows, and the results are shown in Table 6.

o: No rain streak staining observed on the vertical surface
X: Rain streak staining observed on the vertical surface 5. Resistance to Penetration of Stains With respect to the paint compositions of Examples 6 to 10 and Comparative Examples 4 to 6, an SK #1000 primer was applied on an aluminum plate of 150×75×0.8 mm by spray coating so that the dried film thickness would be 30 μm and dried in the standard state for 8 hours.

Next, the prepared paint compositions was applied by spray coating respectively so that the dried film thickness would be 40 μm to make a test body. After drying and curing the prepared test body in the standard state for 7 days, a 15 wt % carbon black aqueous dispersion paste liquid was dropped on the coating surface so as to have a diameter of 20 mm and a height of 5 mm according to JIS K5400 (1990) 8.10 staining-resistance test, and was left to stand in a thermostat chamber at 50° C. for two hours. Thereafter, it was washed in flowing water, and the degree of staining on the coating surface was evaluated by visual observation.

The evaluation was expressed as follows. The test results are shown in Table 6.

o: No trace observed
X: Trace present
<Results>

As described in Table 6, a high luster degree was obtained for the paint compositions of Examples 6 to 10. Also, no generation of sediments due to leaving the paints to stand was observed, and the stability was also excellent. Further, neither adhesion of staining substances nor penetration of the staining substance into the coating material were observed at all from the rain streak staining test and the test of resistance to penetration of stains, thereby exhibiting an excellent resistance to staining.

On the other hand, in Comparative Example 5 using a commercially available alkoxysilane, considerable decrease in the luster degree was observed, and moreover, sediments were generated at a lower portion after the paint was left to stand. It is understood that it is a result of the separation due to poor compatibility of the resin with alkoxysilane. Comparative Example 4 shows an ordinary aqueous fluorine containing resin paint system, and Comparative Example 6 shows an polyurethane resin paint system. In these Comparative Examples, rain streak staining was generated and a considerable penetration of stains was also generated.

From the above results, it has been found out that turbidity and decrease in luster are generated in the clear coating film because the ordinary alkoxysilane has poor stability in water and is also inferior in compatibility with a synthetic resin emulsion. On the other hand, the low-staining agent of the present invention has a good compatibility with a resin, and a high luster value is obtained. Further, it has been found out that, since the dispersion property in water is improved, the orientation of the agent towards the surface is excellent, and a hydrophilic coating surface is formed, thereby exhibiting an excellent non-staining property.

TABLE 1

|  | Synthesis example 1 Condensation product E | Synthesis example 2 Condensation product F | Synthesis example 3 Condensation product G |
|---|---|---|---|
| Condensation product P of ethyl silicate | 100 | 100 |  |
| Condensation product Q of ethyl silicate |  |  | 100 |
| Polyoxyethylene glycol #200 | 106.7 |  |  |
| Polyoxyethylene glycol monocetyl ether |  | 81.7 |  |
| Polyoxyethylene lauryl ether |  |  | 385.4 |
| Silica residual ratio (wt %) | 20.9 | 22.2 | 11.7 |

Condensation product P of ethyl silicate: average molecular weight 750, silica residual ratio 40 wt %
Condensation product Q of ethyl silicate: average molecular weight 900, silica residual ratio 45 wt %
Condensation product: modified condensation product of alkoxysilane

TABLE 2

| Material to be used | Solid component of resin (wt %) | Minimum filming temperature (° C.) | Main monomer composition |
|---|---|---|---|
| Fluorine containing resin emulsion | 50 | 30 | Monochlorotrifluoroethylene ethyl vinyl ether hydroxybutyl vinyl ether |
| Acrylic silicone resin emulsion | 50 | 30 | methyl methacrylate butyl methacrylate, butyl acrylate γ-methacryloxypropyltrimethoxysilane |
| Cross-linkable acrylic resin emulsion | 50 | 10 | methyl methacrylate 2-ethylhexyl acrylate butyl acrylate, styrene vinyl ethyl ketone, (maleic acid dihydrazide) |
| Acrylic resin emulsion 1 | 50 | 30 | methyl methacrylate 2-ethylhexyl acrylate styrene |
| Acrylic resin emulsion 2 | 50 | 30 | methyl methacrylate butyl acrylate 2-hydroxyethyl methacrylate |
| Water-disperable isocyanate compound | Aquanate 200 (made by Nihon Polyurethane Industries KK.) NCO content: 11 to 13 wt %, solid component: 100% | | |
| coloring pigment | rutile-type titanium oxide | | |
| film-increasing auxiliary agent | Texanol | | |
| curing catalyst | dibutyltin laurate | | |

Note: ( ) was added after a polymer was produced.

TABLE 3

| | Example | | | | | | | | | |
|---|---|---|---|---|---|---|---|---|---|---|
| Material to be used | 1 | 2 | 3 | 4 | 5 | 6 | 7 | 8 | 9 | 10 |
| Fluorine containing resin emulsion | 200.0 (100) | | | | | 200.0 (100) | | | | |
| Acrylic silicone resin emulsion | | 200.0 (100) | | | | | 200.0 (100) | | | |
| Cross-linkable acrylic resin emulsion | | | 200.0 (100) | | | | | 200.0 (100) | | |
| Acrylic resin emulsion 1 | | | | 200.0 (100) | | | | | 200.0 (100) | |

TABLE 3-continued

| Material to be used | Example | | | | | | | | | |
|---|---|---|---|---|---|---|---|---|---|---|
| | 1 | 2 | 3 | 4 | 5 | 6 | 7 | 8 | 9 | 10 |
| Acrylic resin emulsion 2 | | | | | 200.0 (100) | | | | | 200.0 (100) |
| water-dispersable isocyanate compound | | | | | 18.8 (1.0) | | | | | 18.8 (1.0) |
| coloring pigment | | | | | | 67.0 | 67.0 | 67.0 | 67.0 | 67.0 |
| film-increasing auxiliary agent | 17.8 | 18.3 | 4.2 | 16.2 | 15.1 | 17.8 | 18.3 | 4.2 | 16.2 | 15.1 |
| Modified condensation product E of alkoxysilane | 23.9 (5.0) | 191.4 (40.0) | | | | 23.9 (5.0) | 191.4 (40.0) | | | |
| Modified condensation product F of alkoxysilane | | | | 45.0 (10.0) | 90.0 (20.0) | | | | 45.0 (10.0) | 90.0 (20.0) |
| Modified condensation product G of alkoxysilane | | | 42.7 (30.0) | | | | | 42.7 (30.0) | | |
| curing catalyst | 1.0 | 4.0 | 3.0 | 1.0 | 2.0 | 1.0 | 4.0 | 3.0 | 1.0 | 2.0 |

Notes:
the numeral in ( ) refers to a value as converted in terms of solid components in the case of a resin emulsion, and refers to a value as converted in terms of $SiO_2$ in the case of a modified condensation product of alkoxysilane.

TABLE 4

| Material to be used | Comparative Example | | | | | |
|---|---|---|---|---|---|---|
| | 1 | 2 | 3 | 4 | 5 | 6 |
| Fluorine containing resin emulsion | 200.0 (100) | | | 200.0 (100) | | |
| Acrylic silicone resin emulsion | | 200.0 (100) | | | | |
| Cross-linkable acrylic resin emulsion | | | | | | |
| Acrylic resin emulsion 1 | | | 200.0 (100) | | 200.0 (100) | |
| Acrylic resin emulsion 2 | | | | | | 200.0 (100) |
| water-dispersable isocyanate compound | | | | | | 18.8 (1.0) |
| coloring pigment | | | | 67.0 | 67.0 | 67.0 |
| film-increasing auxiliary agent | 17.8 | 18.3 | 16.2 | 17.8 | 18.3 | 15.1 |
| Condensation product P of ethyl silicate | 12.5 (5.0) | | 25.0 (10.0) | | 25.0 (10.0) | |
| curing catalyst | 1.0 | | 1.0 | | 1.0 | |

Notes:
the numeral in ( ) refers to a value as converted in terms of solid components in the case of a resin emulsion, and refers to a value as converted in terms of $SiO_2$ in the case of a modified condensation product of alkoxysilane.

TABLE 5

| | Example | | | | | Comparative Example | | |
|---|---|---|---|---|---|---|---|---|
| | 1 | 2 | 3 | 4 | 5 | 1 | 2 | 3 |
| Compatibility evaluation result | ○ | ○ | ○ | ○ | ○ | x | x | Δ |

TABLE 6

| | | Example | | | | | Comparative Example | | |
|---|---|---|---|---|---|---|---|---|---|
| | | 6 | 7 | 8 | 9 | 10 | 4 | 5 | 6 |
| Degree of luster | Blank (no addition of a low-staining agent) | 80 | 86 | 85 | 87 | 86 | 80 | 86 | 86 |
| | A low-staining agent added | 80 | 86 | 84 | 88 | 87 | — | 36 | — |
| Paint stability | | ○ | ○ | ○ | ○ | ○ | ○ | x | ○ |
| Rain streak staining property (after 6 months) | | ○ | ○ | ○ | ○ | ○ | x | ○ | x |
| Resistance to penetration of stains | | ○ | ○ | ○ | ○ | ○ | x | ○–x | x |

What is claimed is:

1. An aqueous paint low-staining agent characterized by being a modified condensation product of alkoxysilane having at least one polyoxyalkylene group and an alkoxyl group, wherein a repetition unit of said polyoxyalkylene group has 1 to 4 carbon atoms, and said alkoxyl group has 1 to 4 carbon atoms; and
    wherein each silicon atom in the agent is bonded directly to 4 oxygen atoms.

2. An aqueous paint low-staining agent according to claim 1, characterized in that said polyoxyalkylene group is a polyoxyethylene group having two carbon atoms in the repetition unit, and said alkoxyl group is an ethoxy group having two carbon atoms.

3. A low-staining aqueous paint composition characterized in that 1.0 to 40.0 parts by weight, as converted in terms of $SiO_2$, of an aqueous paint low-staining agent (B) are added to 100 parts by weight of a solid component of a synthetic resin emulsion (A), said aqueous paint low-staining agent being a modified condensation product of alkoxysilane having an average degree of condensation ranging from 1 to 20 and having at least one polyoxyalkylene group and an alkoxyl group, wherein a repetition unit of said polyoxyalkylene group has 1 to 4 carbon atoms, and said alkoxyl group has 1 to 4 carbon atoms; wherein each silicon atom in the agent is bonded directly to 4 oxygen atoms.

4. A low-staining aqueous paint composition according to claim 3, characterized in that said aqueous paint low-staining agent (B) is one in which said polyoxyalkylene group is a polyoxyethylene group having two carbon atoms in the repetition unit, and said alkoxyl group is an ethoxy group having two carbon atoms.

5. A low-staining aqueous paint composition according to claim 3, characterized in that said synthetic resin emulsion (A) is an acrylic resin emulsion.

6. A low-staining aqueous paint composition according to claim 3, characterized in that said synthetic resin emulsion (A) is an acrylic silicone resin emulsion.

7. A low-staining aqueous paint composition according to claim 3, characterized in that said synthetic resin emulsion (A) is a fluorine containing resin emulsion.

8. A low-staining aqueous paint composition according to claim 3, characterized in that said synthetic resin emulsion (A) is an urethane resin emulsion.

9. A low-staining aqueous paint composition according to claim 3, characterized in that said synthetic resin emulsion (A) comprises at least one component that undergoes a cross-linking reaction.

10. A process for use of a low-staining aqueous paint composition, characterized in that 1.0 to 40.0 parts by weight, as converted in terms of $SiO_2$, of a low-staining agent (B) for aqueous paint are added and mixed to 100 parts by weight of a solid component of a synthetic resin emulsion (A) for paint, said low-staining agent (B) for aqueous paint being a modified condensation product of alkoxysilane having at least one polyoxyalkylene group and an alkoxyl group, wherein a repetition unit of said polyoxyalkylene group has 1 to 4 carbon atoms, and said alkoxyl group has 1 to 4 carbon atoms, and wherein each silicon atom in the agent is bonded directly to 4 oxygen atoms.

* * * * *

UNITED STATES PATENT AND TRADEMARK OFFICE
CERTIFICATE OF CORRECTION

PATENT NO. : 6,433,076 B1
DATED : August 13, 2002
INVENTOR(S) : Shigeto Kamimura et al.

It is certified that error appears in the above-identified patent and that said Letters Patent is hereby corrected as shown below:

Column 2,
Line 55, "it least" should read -- at least --.

Column 3,
Line 57, "$(R^1O)_{4-a}(R^2)_a$" should read -- $(R^1O)_{4-a}Si(R^2)_a$ --.

Column 5,
Line 35, "to a,;" should read -- to as --.

Column 7,
Lines 55-56, "hexatluoropropylene" should read -- hexafluoropropylene --.

Column 11,
Line 25, "for-compatibility" should read -- for compatibility --.

Signed and Sealed this

Fourth Day of February, 2003

JAMES E. ROGAN
*Director of the United States Patent and Trademark Office*